United States Patent
Brocato et al.

[11] Patent Number: 5,372,509
[45] Date of Patent: Dec. 13, 1994

[54] HEALTHY CHOICES PLAY AND REWARD KIT

[76] Inventors: Sally K. Brocato, 1348 Thorpe La. #701, San Marcos, Tex. 78666-7136; George Spector, 233 Broadway Rm. 702, New York, N.Y. 10279

[21] Appl. No.: 79,397
[22] Filed: Jun. 21, 1993
[51] Int. Cl.5 .............................................. G09B 19/00
[52] U.S. Cl. ...................... 434/238; 434/236; 446/268
[58] Field of Search ............... 434/238, 237, 236, 365, 434/128, 396, 428, 433; 446/372, 387, 369, 268

[56] References Cited

U.S. PATENT DOCUMENTS

| 1,926,139 | 9/1933 | Browne | 434/365 |
| 3,281,966 | 11/1966 | Johnson | 434/238 |
| 4,762,494 | 8/1988 | Woods | 434/236 |
| 4,795,397 | 1/1989 | Stevens | 446/369 X |
| 5,257,940 | 11/1993 | Schaarschmidt | 434/238 X |

FOREIGN PATENT DOCUMENTS 2239814 7/1991 United Kingdom ................ 446/372

Primary Examiner—Gene Mancene
Assistant Examiner—Jeffrey A. Smith

[57] ABSTRACT

A healthy choices play and reward kit is provided and consists of a doll representing a child, a chart representing each day of the week and attachable stickers placed upon the chart to reinforce choices to be made by the child each day. The kit will help the child not to do bad things and not to do bad things to other people.

1 Claim, 1 Drawing Sheet

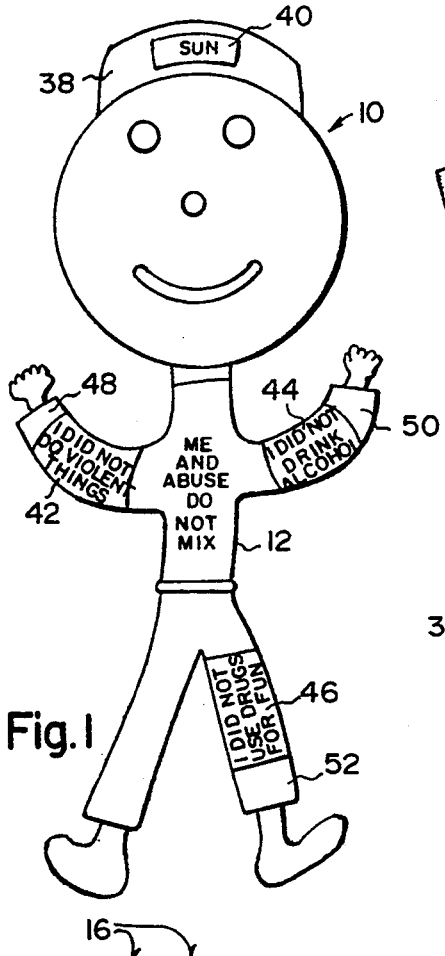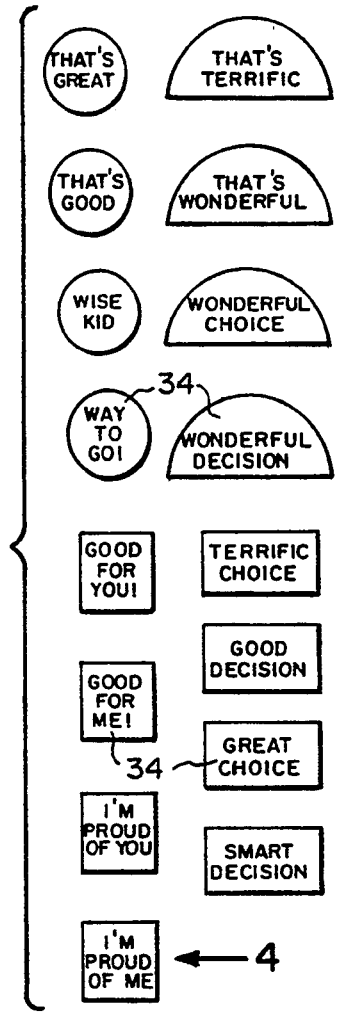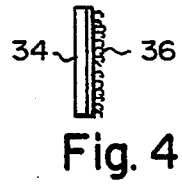

5,372,509

1

HEALTHY CHOICES PLAY AND REWARD KIT

BACKGROUND OF THE INVENTION

The instant invention relates generally to educational games and more specifically it relates to a healthy choices play and reward kit, which provides a doll and a chart with stickers that will help a child to make the right choices each day of the week.

There are available various conventional educational games which do not provide the novel improvements of the invention herein disclosed.

SUMMARY OF THE INVENTION

A primary object of the present invention is to provide a healthy choices play and reward kit that will overcome the shortcomings of the prior art devices.

Another object is to provide a healthy choices play and reward kit that will help a child in making choices not to do bad things and not to do bad things to other people.

An additional object is to provide a healthy choices play and reward kit that includes a doll representing the child and a chart representing each day of a week, with attachable stickers to reinforce choices to be made by the child each day.

A further object is to provide a healthy choices play and reward kit that is simple and easy to use.

A still further object is to provide a healthy choices play and reward kit that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front view of the doll of the instant invention showing a modification thereon being separate stickers to match with the chart and a cap with seven stickers for each day.

FIG. 2 is a rear view of the sweatshirt of the doll in FIG. 1.

FIG. 3 is a front view of the stickers used on the chart.

FIG. 4 is a side view of one of the stickers as indicated by arrow 4 in FIG. 3, showing the Velcro (hook and pile fastener) on the back.

FIG. 5 is a plan view of the chart.

DETAILED DESCRIPTION OF THE PREFERRED EMBODIMENTS

Turning now descriptively to the drawings, in which similar reference characters denote similar elements throughout the several views.

A healthy choices play and reward kit is provided and consists of a doll 10, shown in FIG. 1, representing a child, so as to help the child in making choices not to do bad things and not to do bad things to other people. A sweatshirt 12, shown in FIGS. 1 and 2, is worn on the doll 10 and has indicia on the front reading "ME AND ABUSE DO NOT MIX" and indicia on the back reading "HEALTHY CHOICE CHILD".

FIG. 5 shows a chart 14 in which seven vertical columns 16 are on the chart 14. Seven horizontal spaces 18 are provided, each located on top of each column 16, having indicia therein being one day of the week reading "SUN", "MON", "TUES", "WED", "THURS", "FRI" and "SAT". Six vertical blocks 20, 22, 24, 26, 28, and 30 are in each column 16 below the respective space 18. The first block 20 has indicia thereon reading "I DID NOT DO VIOLENT THINGS". The third block 24 has indicia thereon reading "I DID NOT DRINK ALCOHOL". The fifth block 28 has indicia thereon reading "I DID NOT USE DRUGS FOR FUN". A first portion 32 of mating hook and loop pile fastener material is on the second, fourth and sixth blocks, 22, 26 and 30.

A plurality of stickers 34, as shown in FIG. 3, has different geometric shapes and different indicia thereon being positive sayings. A second portion 36 of the mating hook and loop pile fastener material is on back of each sticker 34, as shown in FIG. 4. Each sticker 34 can be removably attached to one of the second, third and fifth blocks 22, 26 and 30 in each column 16, by the child each day of the week to reinforce choices to be made by the child.

Referring again to FIG. 1, a hat 38 is worn by the doll 10. Seven labels 40 are provided for the hat 38, with each having indicia thereon being of the day of the week reading "SUN", "MON", "TUES", "WED", "THURS", "FRI" and "SAT", which match up with each day of the week on the chart 14. Three signs 42, 44 and 46 are also provided, with each having indicia thereon. The first sign 42 reads "I DID NOT DO VIOLENT THINGS" and is worn on one arm 48 of the doll 10. The second sign 44 reads "I DID NOT DRINK ALCOHOL" and is worn on the other arm 50 of the doll 10. The third sign 46 reads "I DID NOT USE DRUGS FOR FUN" and is worn on one leg 52 of the doll 10. The indicia on the signs 42, 44 and 46 match up with the indicia in each first, third and fifth block 20, 24 and 28 in each column 16 on the chart 14.

OPERATION OF THE INVENTION

To use the kit a child will take the doll 10 and place the hat 38 on it with the proper label 40. For example, if it is Tuesday the label 40 with "TUES" is placed upon the hat 38. The column 16 dated "TUES" on the chart 14 is now utilized. If the child did not do violent things, the sign 42 is placed upon the arm 48 of the doll 10 and a sticker 34 is placed on the block 22 on the chart 14. If the child did not drink alcohol, the sign 44 is placed upon the arm 50 of the doll 10 and a sticker 34 is placed on the block 26 on the chart 14. If the child did not use drugs for fun, the sign 46 is placed upon the leg 52 of the doll and a sticker 34 is placed on the block 30 on the chart 14. This is all done in the Tuesday column. The chart 14 is used for all of the days of the week.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A healthy choices play and reward kit which comprises:

a) a doll representing a child, so as to help the child in making choices not to do bad things and not to do bad things to other people;
b) a sweatshirt worn on said doll having indicia on a front side thereof reading "ME AND ABUSE DO NOT MIX" and indicia on a back side thereof reading "HEALTHY CHOICE CHILD";
c) a chart;
d) seven vertical columns on said chart;
e) seven horizontal spaces, each located on top of each said column, having indicia therein being one day of the week reading "SUN", "MON", "TUES", "WED", "THURS", "FRI" and "SAT";
f) six vertical blocks in each said column below said column's respective space in which a first of said blocks has indicia thereon reading "I DID NOT DO VIOLENT THINGS", a third of said blocks has indicia thereon reading "I DID NOT DRINK ALCOHOL" and a fifth of said blocks has indicia thereon reading "I DID NOT USE DRUGS FOR FUN";
g) a first portion of mating hook and loop pile fastener material on a second, fourth and sixth of said blocks;
h) a plurality of stickers having different geometric shapes and different indicia thereon being positive sayings;
i) a second portion of said mating hook and loop pile fastener material on a back side of each said sticker, so that each said sticker can be removably attached to one of said second, third and fifth blocks in each said column by the child each day of the week to reinforce choices to be made by the child;
j) a hat worn by said doll;
k) seven labels, each having indicia thereon being of the day of the week reading "SUN", "MON", "TUES", "WED", "THURS", "FRI" and "SAT", which match up with each day of the week on said chart; and
l) three signs, each having indicia thereon in which said first sign reads "I DID NOT DO VIOLENT THINGS" and is worn on one arm of said doll, said second sign reads "I DID NOT DRINK ALCOHOL" and is worn on the other arm of said doll and said third sign reads "I DID NOT USE DRUGS FOR FUN" and is worn on one leg of said doll, whereby said indicia on said signs match up with said indicia in each said first, third and fifth block in each said column on said chart.

* * * * *